United States Patent
Zeevi

(10) Patent No.: US 7,512,864 B2
(45) Date of Patent: Mar. 31, 2009

(54) SYSTEM AND METHOD OF ACCESSING NON-VOLATILE COMPUTER MEMORY

(76) Inventor: Josef Zeevi, 14801 Endicott Dr., Austin, TX (US) 78728

( * ) Notice: Subject to any disclaimer, the term of this patent is extended or adjusted under 35 U.S.C. 154(b) by 497 days.

(21) Appl. No.: 11/242,425

(22) Filed: Sep. 30, 2005

(65) Prior Publication Data

US 2007/0089033 A1    Apr. 19, 2007

(51) Int. Cl.
*G11C 29/00* (2006.01)

(52) U.S. Cl. ................................. 714/766

(58) Field of Classification Search .............. 714/763, 714/766; 365/230.01–230.09
See application file for complete search history.

(56) References Cited

U.S. PATENT DOCUMENTS

| | | | |
|---|---|---|---|
| 5,630,093 A | 5/1997 | Holzhammer et al. | |
| 5,963,983 A | 10/1999 | Sakakura et al. | |
| 6,282,624 B1 | 8/2001 | Kimura et al. | |
| 6,427,186 B1 * | 7/2002 | Lin et al. | 711/103 |
| 6,513,095 B1 | 1/2003 | Tomori | |
| 6,591,329 B1 | 7/2003 | Kakinuma et al. | |
| 6,725,321 B1 | 4/2004 | Sinclair et al. | |
| 6,831,865 B2 | 12/2004 | Chang et al. | |
| 6,882,592 B2 * | 4/2005 | Noguchi et al. | 365/230.03 |
| 7,181,611 B2 * | 2/2007 | Chang et al. | 713/100 |
| 7,193,916 B2 * | 3/2007 | Yokota et al. | 365/218 |
| 7,231,580 B2 * | 6/2007 | Shiota et al. | 714/765 |
| 7,239,547 B2 * | 7/2007 | Suda | 365/185.09 |
| 2003/0229753 A1 | 12/2003 | Hwang | |
| 2004/0085849 A1 | 5/2004 | Myoung et al. | |
| 2005/0038954 A1 * | 2/2005 | Saliba | 711/100 |
| 2005/0108301 A1 * | 5/2005 | Lou et al. | 707/203 |

FOREIGN PATENT DOCUMENTS

EP    1 148 650 A1    10/2001

* cited by examiner

*Primary Examiner*—Esaw T Abraham
*Assistant Examiner*—Sam Rizk
(74) *Attorney, Agent, or Firm*—Toler Law Group

(57) ABSTRACT

A system and method for organizing a non-volatile memory is provided. The system includes a non-volatile memory with a first data region and a first redundant memory area associated with the first data region. The first redundant memory area includes a first portion associated with a first data sector. The first portion of the redundant memory area includes a relative sector index and a block number. The redundant memory area also includes a second portion including error correction code (ECC) data.

10 Claims, 6 Drawing Sheets

SYSTEM AND METHOD OF ACCESSING NON-VOLATILE COMPUTER MEMORY

FIELD OF THE DISCLOSURE

The present disclosure is generally related to non-volatile memory systems.

BACKGROUND

Consumer electronic devices, such as cellular telephones, digital music players, thumb drives and other handheld devices, execute increasingly complicated algorithms, such as algorithms for decoding compressed digital audio and video data and user interface algorithms. As the complexity of these algorithms increases, so does the memory usage for storing such algorithms.

Increasingly, manufacturers are turning to non-volatile memory devices, such as flash memory devices including NAND flash and NOR flash memory devices. Typically, non-volatile memory devices store data in logical units, such as memory pages and memory blocks. A set of memory pages form a memory block. Often, data is written to a page and may be read from locations within that page. Typically, a block is the smallest amount of data that may be erased. In a typical flash device, each page has a data area and a redundant memory area, sometimes referred to as an overhead area or metadata area. The redundant memory area of the page stores information about the page, information about data within the page, and data associated with error correction procedures for the page.

Accessing and storing data on non-volatile memory devices, such as flash memory, utilizes virtual addressing. Non-volatile memory devices tend to wear with use and, as such, sectors within a solid-state memory device may lose the capacity to store error free data. To reduce the problem of solid-state memory wear, microcontrollers generally balance usage between sectors of the memory. For example, when data is provided to a flash memory device it may be stored in a first sector and when the data is updated the microcontroller may store the data in a second sector, reducing wear on the first sector. As a result, the physical location of a block of data may change. To facilitate this balancing and to address changing physical addresses, microcontrollers generally create a table that is used to convert location based addresses used by computational systems to the virtual addresses used within the flash memory devices. In this manner, a system may address a set of data using the same location based address while a microcontroller may store that information in changing sectors of the flash memory or at different addresses within the flash memory depending upon the balancing protocols. When a sector turns bad within the flash memory device, the microcontroller may create a mapping of bad data sectors to prevent storage of data in such bad data sectors.

The cataloging of bad sectors and creation of sector maps is typically performed by reading a data sector and checking for particular code values in the system data. Generally, an ECC associated with all of the data of a data sector is included in a data sector for use in correcting and checking for noise in the data. For example, an ECC is calculated based on data when the data is stored and the ECC is stored with the data. When the data is accessed, a new ECC is calculated from the data and compared to the ECC stored with the data. If there is a difference between the new ECC and the stored ECC, the data is likely corrupted and the sector may be bad. In many examples, ECCs may be used to correct the data before transmission to subsequent memory systems or processors.

However, the process of reading data in a non-volatile memory and performing error correction on corrupted data is a time consuming process. As such, there is a need for an improved system and method for reading non-volatile memory.

DESCRIPTION OF THE DRAWINGS

A system and method for organizing a non-volatile memory is disclosed. The system includes a non-volatile memory with a first data region and a first redundant memory area associated with the first data region. The first redundant memory area includes a first portion associated with a first data sector. The first portion of the redundant memory area includes a relative sector index and a block number. The redundant memory area also includes a second portion including error correction code (ECC) data.

The method includes reading a first portion of a redundant memory area of a data sector of a non-volatile computer memory. The redundant memory area includes the first portion and a second portion. The first portion of the redundant memory area includes data associated with the data sector and includes a relative sector index and a block number. In a particular embodiment, the first portion is read without reading a second portion of the redundant memory area.

Figure 1:
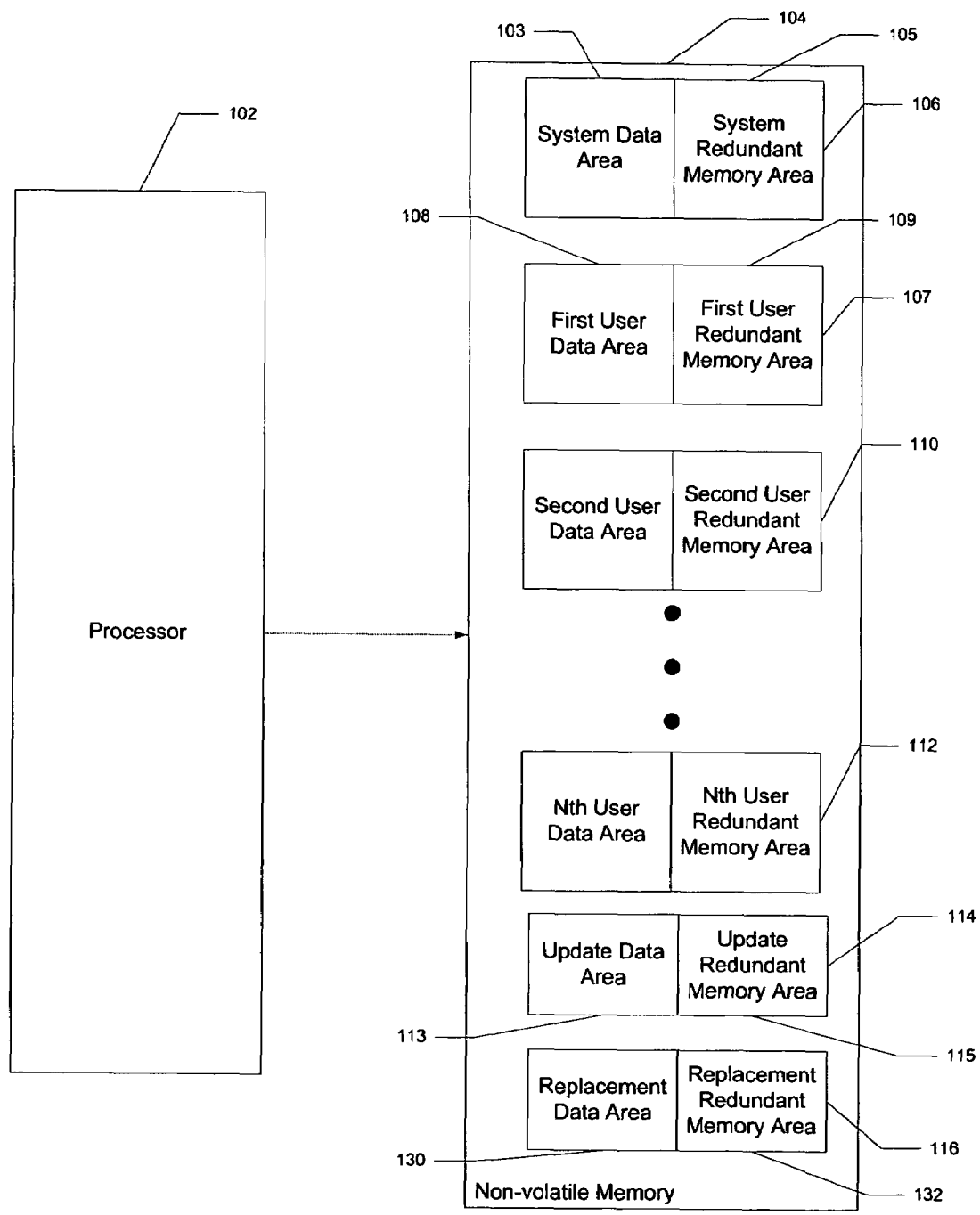
FIG. 1 is a block diagram of an exemplary embodiment of a system including a non-volatile memory.

Referring to FIG. 1, a system including a non-volatile memory is shown. The system includes a processor 102 and a non-volatile memory 104. The non-volatile memory 104 is responsive to the processor 102. The non-volatile memory 104 includes a system data region 106. The system data region 106 includes a system data area 103 and a system redundant memory area 105. The non-volatile memory 104 also includes a first user data region 107, a second user data region 110, and additional user data regions through $N^{th}$ user data region 112. The first data region 107 includes a first user data area 108 and a first redundant memory area 109. Other data regions, such as the second user data region 110, also include user data areas and redundant memory areas.

The non-volatile memory 104 further includes an update data region 114, which includes an update data area 113 and an update redundant memory area 114. The non-volatile memory also includes a replacement data region 116, which includes a replacement data area 130 and a replacement redundant memory area 132.

During operation, the processor 102 accesses the non-volatile memory 104. The processor 102 may access the system data 106 to perform system operations. The processor 102 may use the update data region 114 to store data that may later be reorganized during an update operation. The processor 102 may use the replacement data region 116 to store replacement data for the data regions, such as the first data region 107, during a replacement operation.

The data regions, such as the first data region 107, the system data area 103, the update data area 113, or the replacement data area 130, store data associated with the data region. The redundant memory areas, such as the first redundant memory area 109 may store a variety of information including a relative sector index, a block number, or error correction code (ECC) data. The relative sector index and the block number stored in the first redundant memory area 109 may be used to organize the data stored in the first user data area 108, and may be used as part of an organization scheme for the non-volatile memory 104. Different portions of the first redundant memory area 109 may be accessed independently. Accordingly, the relative sector index and the block number stored in the first redundant memory area 109 may be accessed without accessing the ECC data. By accessing only the relative sector index and the block number, without accessing the ECC data or the first user data area 108, the non-volatile memory 104 may be organized more quickly.

Although the protection and organization scheme discussed above is described with reference to the user data areas, such as the first data region 107, the same scheme may be used for all data regions, including the system data region 106, the update data region 114, and the replacement data region 116. Thus, the system redundant memory area 105, the update redundant memory area 114, and the replacement redundant memory area 132 each include a variety of information including a relative sector index, a block number, or error correction code (ECC) data. The relative sector index and block number stored in each redundant memory area may be used to organize the data area associated with that region.

Figure 2:
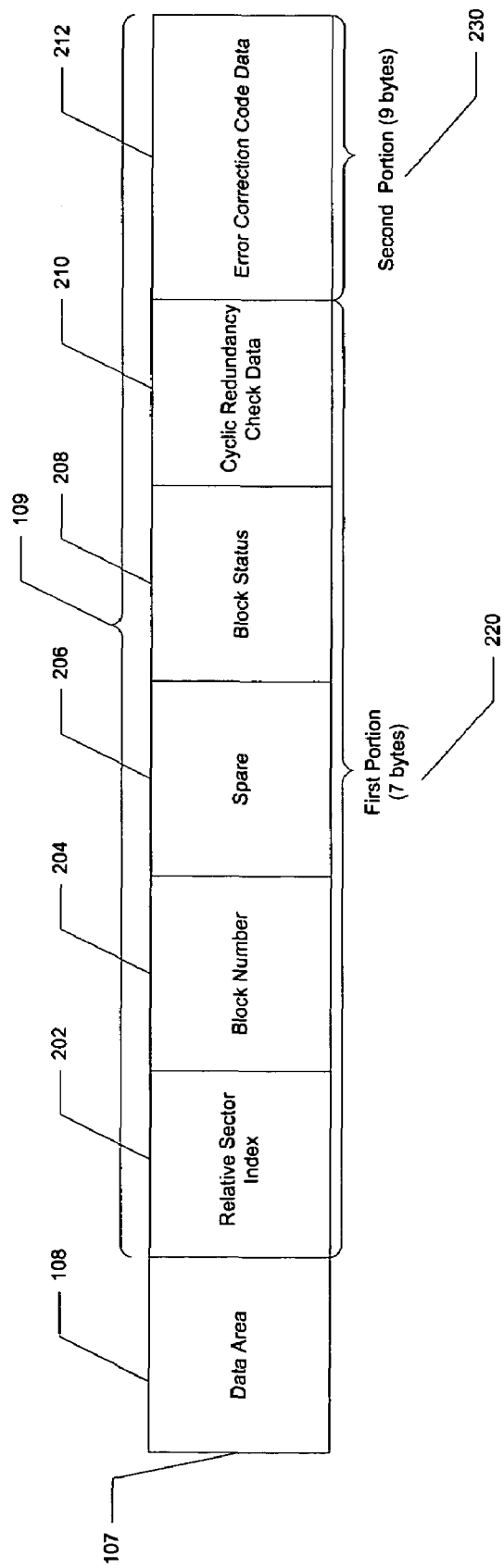
FIG. 2 is a block diagram of an illustrative embodiment of a data structure that may stored in the non-volatile memory of FIG. 1.

Referring to FIG. 2, a data structure for a data region of a non-volatile memory, such as the first data region 107 illustrated in FIG. 1 is shown. The data region 107 includes a data area 108 and a redundant memory area 109. The redundant memory area 109 includes a first portion 220 and a second portion 230. In a particular embodiment the first portion 220 of the redundant memory area 109 is about 7 bytes in length. In another particular embodiment the second portion 230 is about 9 bytes in length.

The first portion 220 includes relative sector index data 202, block number data 204, spare data 206, block status data 208, and cyclic redundancy check (CRC) data 210. The second portion 230 includes ECC data 212.

During operation, the first portion 220 may be read by a processor without reading the second portion 230. The relative sector index data 202 and the block number data 204 may be accessed to organize data associated with a particular memory block without accessing the ECC data 212 stored in the second portion 230. This allows for faster organization of the memory block.

In addition, block status data 208 may be used to determine whether data associated with a particular block is valid data. The cyclic redundancy check data 210 may be used to determine if there are any errors associated with the user data area 108. In the event that an error associated with the user data area 108 is detected, the error correction code data 212 stored in the second portion 230 may be accessed to perform error correction procedures. Because the error correction code data 212 is not accessed unless the CRC data 210 indicates an error condition, time-consuming ECC operations may be avoided when errors are not present.

Figure 3:
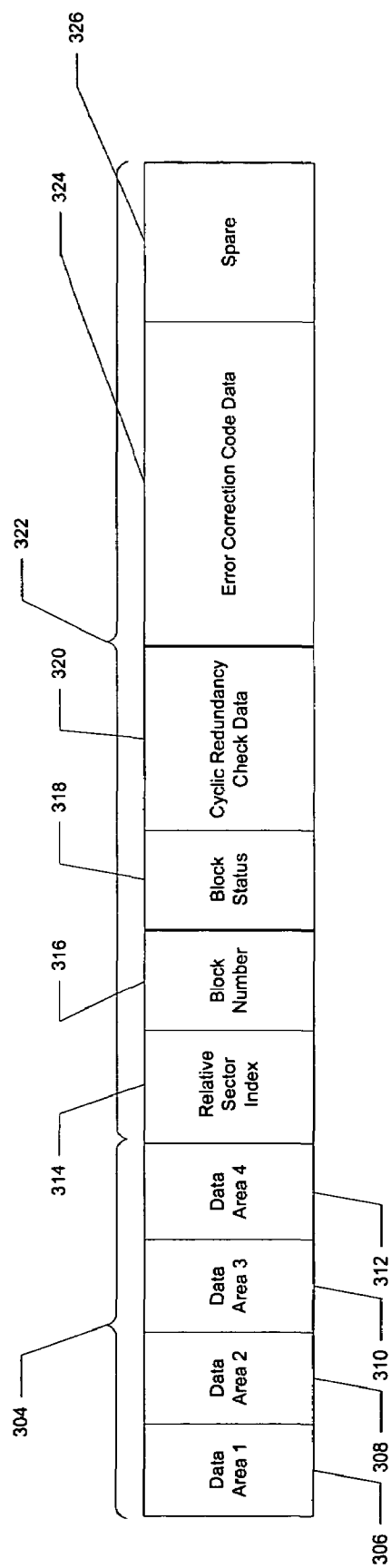
FIG. 3 is a block diagram of another particular embodiment of a data structure that may be stored in the non-volatile memory of FIG. 1.

Referring to FIG. 3, an alternative embodiment of a data structure for use in the non-volatile memory 104 is shown. The data structure includes a first data region 304 and a first redundant memory area 322. The first data region includes a plurality of sub-regions including data area 306, data area 308, data area 310, and data area 312. The redundant memory area 322 includes a relative sector index 314, a block number 316, a block status 318, cyclic redundancy check (CRC) data 320, error correction code data 324, and spare data 326. In a particular embodiment, the redundant memory area 322 has a size of greater than or equal to 64 bytes.

During operation, user data may be stored in the first data region 304, while the redundant memory area 322 stores system data associated with the first data region 304. Different sections of the redundant memory area 322 may be accessed independently. Accordingly, the relative sector index 314 and the block number 316 may be used to organize the data in the first data region 304 without accessing the error correction code data 324. Similarly, the CRC data 320 may be used for error checking of the first data region 304 without accessing the ECC data 324. The error correction code data 324 may be used to correct errors associated with the first data region 304 if the CRC data 320 indicates an error in the region. Because the ECC data 324 is not accessed until an error condition is indicated, more rapid organization and error checking of the first data region 304 is possible.

Figure 4:
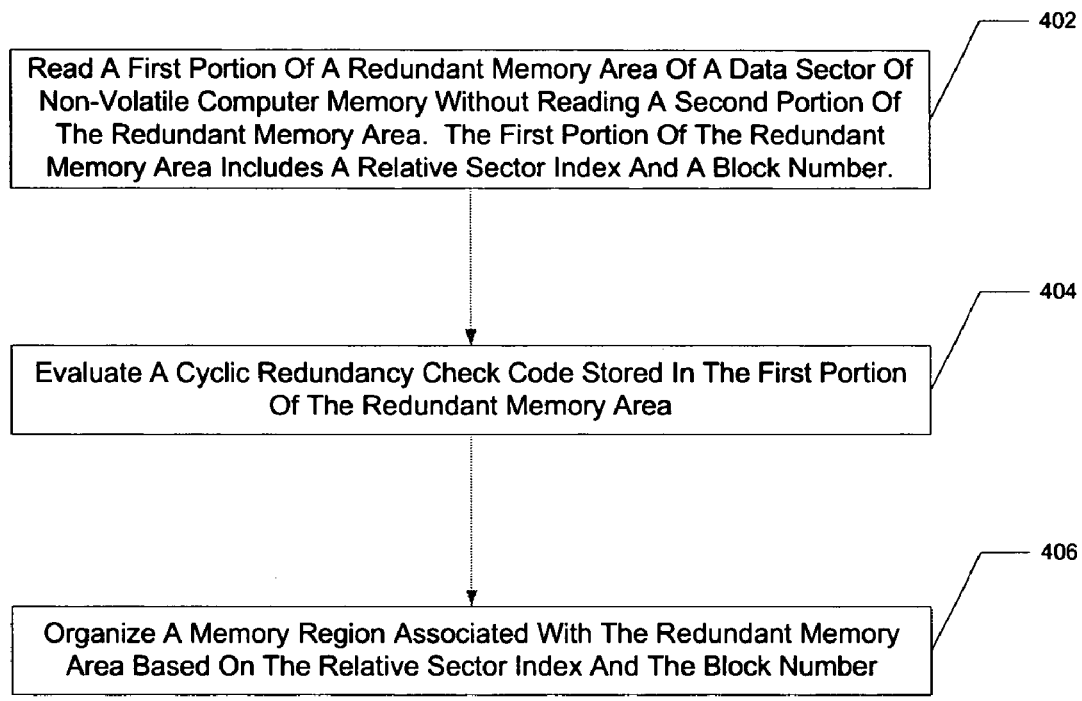
FIG. 4 is a flow chart of a method of organizing the non-volatile memory of FIG. 1.

Referring to FIG. 4, a method of organizing a non-volatile computer memory is illustrated. At step 402, a first portion of a redundant memory area of a data sector of a non-volatile computer memory is read. The first portion is read without reading a second portion of the redundant memory area. The first portion of the redundant memory area includes data associated with the data sector. In a particular embodiment the first portion of the redundant memory area has a size of less than 8 bytes. In another particular embodiment the first portion of the redundant memory area has a size of 7 bytes. The first portion of the redundant memory area includes a relative sector index and a block number.

Proceeding to step 404, a cyclic redundancy check (CRC) code that is stored in the first portion of the redundant memory area is evaluated. At step 406, a memory region associated with the redundant memory area is organized based on the relative sector index and the block number.

Figure 5:
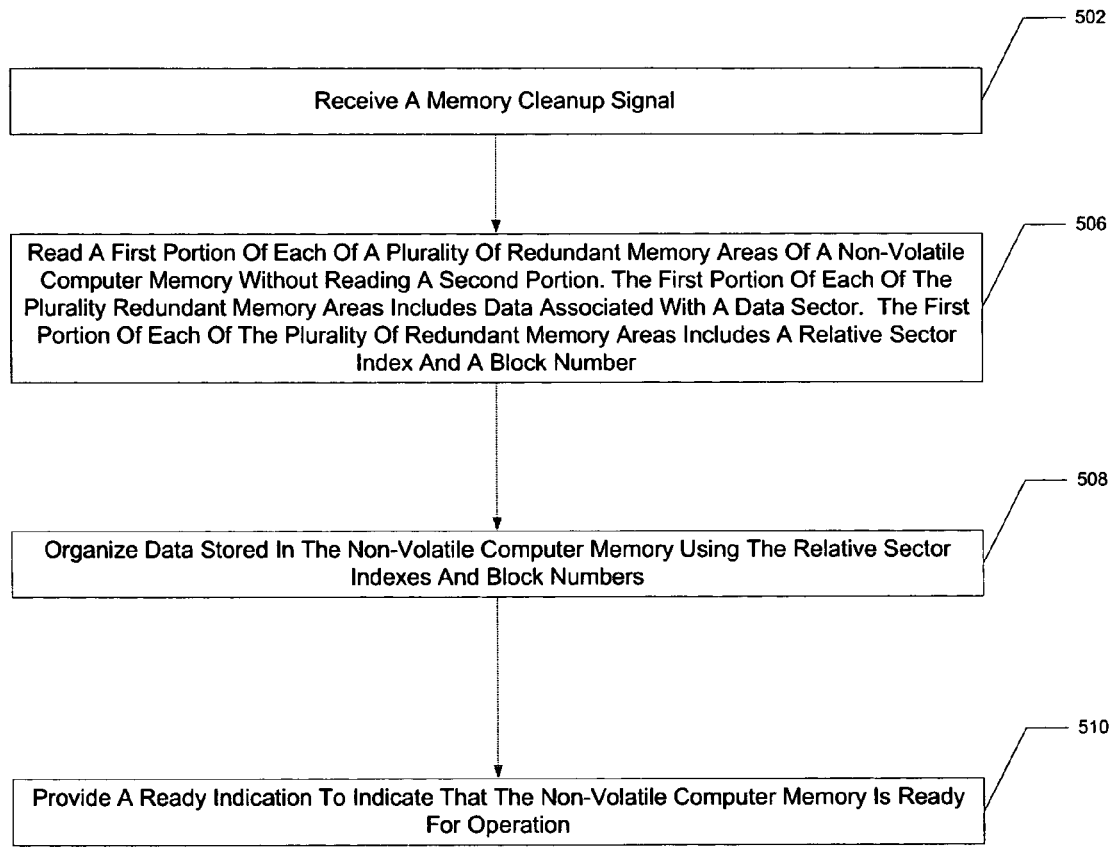
FIG. 5 is a flow chart of a method of performing a cleanup operation on the non-volatile memory of FIG. 1.

Referring to FIG. 5, a method of performing a memory clean up operation is illustrated. At step 502, a memory clean up signal is received. Moving to step 506, a first portion of each of a plurality of redundant memory areas of a non-volatile computer memory are read without reading a second portion. The first portion of each of the plurality of redundant memory areas includes data associated with the data sector. The first portion of each of the plurality of redundant memory areas includes a relative sector index and a block number. The second portion includes ECC data. In a particular embodiment the memory clean up signal is sent in response to a system power up.

Moving to step 508, data stored in a non-volatile computer memory is organized using the relative sector indexes and block numbers. At step 510, a ready indication is provided to indicate that the non-volatile computer memory is ready for operation. In a particular embodiment, the time between receiving the memory clean up signal and providing the ready indication is less than about thirty microseconds. In another particular embodiment, the time between receiving the memory clean up signal and providing the ready indication is less than about twenty-six microseconds.

Figure 6:
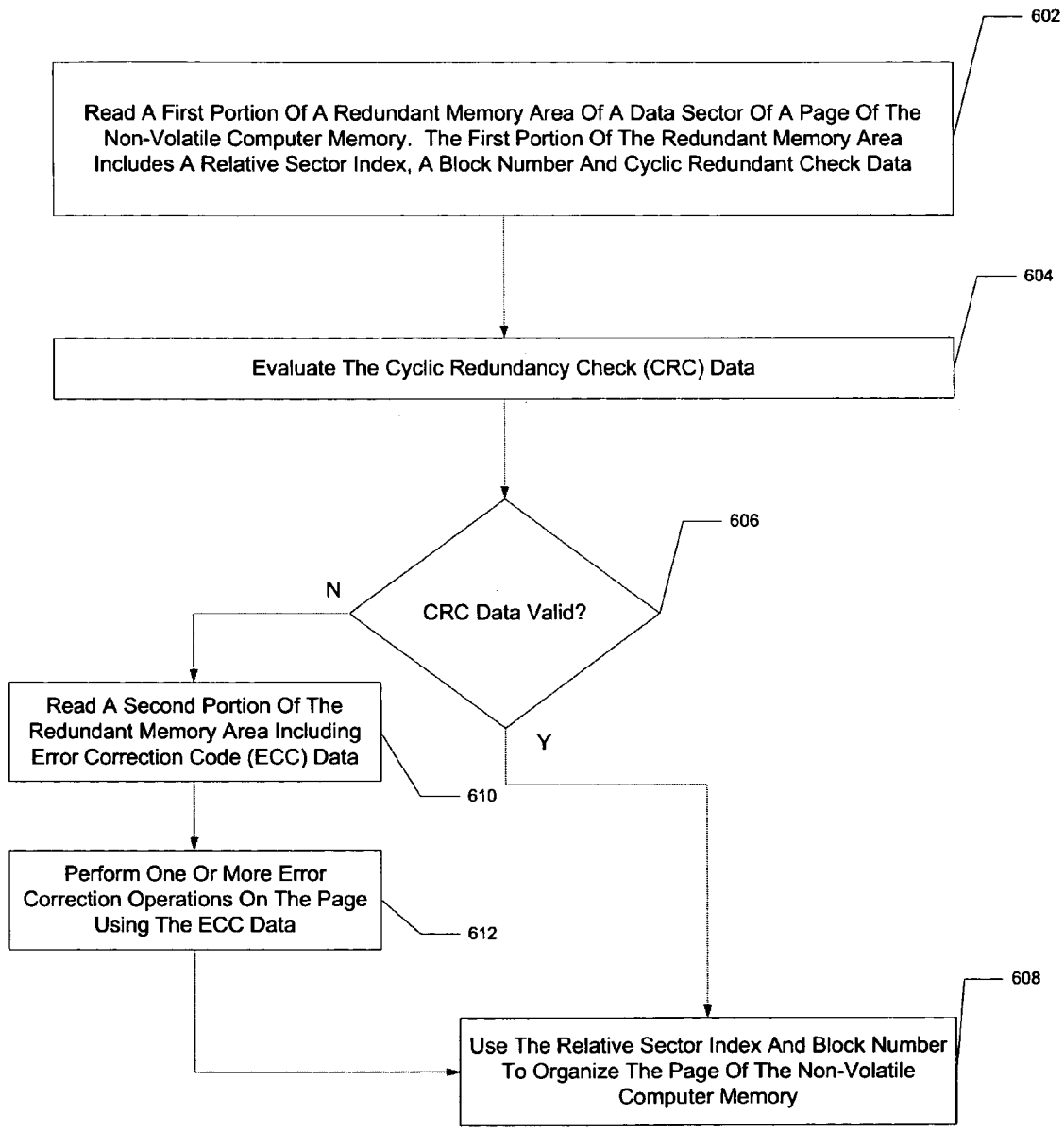
FIG. 6 is a flow chart of a method of performing error correction on the non-volatile memory of FIG. 1.

Referring to FIG. 6, a method of performing error correction on a non-volatile computer memory is illustrated. At step 602, a first portion, but not all, of a redundant memory area of a data sector of a page of the non-volatile computer memory is read. The first portion of the redundant memory area includes a relative sector index, a block number, and CRC data. Moving to step 604, the CRC data is evaluated. Moving to decision step 606, it is determined whether the CRC data is valid. If the CRC data is valid the method moves to step 608 and the relative sector index and the block number are used to organize the page of the non-volatile computer memory. If the CRC data is not valid the method moves to step 610 and a second portion of the redundant memory area including error correction code (ECC) data is read. Proceeding to step 612 one or more error correction operations are performed on the page using the ECC data. The method then moves to step 608.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A non-volatile computer memory comprising:
    a first data region including a plurality of subregions;
    a first redundant memory area associated with the first data region, the first redundant memory area including:
        a first portion associated with a first of the subregions, wherein the first portion of the redundant memory area includes a relative sector index and a block number; and
        a second portion including a plurality of error correction code (ECC) regions, the plurality of error correction code (ECC) regions associated with the plurality of subregions;
    wherein the first portion is about 7 bytes and the second portion is about 9 bytes.

2. A non-volatile computer memory comprising:
    a first data region including a plurality of subregions;
    a first redundant memory area associated with the first data region, the first redundant memory area including:
        a first portion associated with a first of the subregions, wherein the first portion of the redundant memory area includes a relative sector index and a block number; and
        a second portion including a plurality of error correction code (ECC) regions, the plurality of error correction code (ECC) regions associated with the plurality of subregions;
    a second data region;
    a second redundant memory area associated with the second data region, the second redundant memory area including:
        a first portion associated with a second data sector that includes a relative sector index and a block number; and
        a second portion including second error correction code (ECC) data.

3. A method of reading a non-volatile computer memory, the method comprising:
    reading a first portion of a redundant memory area of the non-volatile computer memory, the redundant memory area including the first portion and a second portion, wherein the non-volatile computer memory comprises:
        a first data region including a plurality of subregions;
        the redundant memory area associated with the first data region, the redundant memory area including:
            the first portion associated with a first of the plurality of subregions, wherein the first portion includes a relative sector index and a block number; and
            the second portion including a plurality of error correction code (ECC) regions, the plurality of error correction code (ECC) regions associated with the plurality of subregions;
        wherein the first portion of the redundant memory area is read without reading the second portion of the redundant memory area.

4. The method of claim 3, wherein the first portion of the redundant memory area has a size of less than 8 bytes.

5. The method of claim 4, wherein the first portion of the redundant memory area has a size of 7 bytes.

6. A method of performing error correction on a non-volatile computer memory, the method comprising:
    reading a first portion, but not all, of a redundant memory area of a data sector of a page of the non-volatile computer memory, wherein the first portion of the redundant memory area includes a relative sector index, a block number and cyclic redundancy check data;
    evaluating the cyclic redundancy check data; and
    using the relative sector index and the block number to organize the page of the non-volatile computer memory in response to a determination that the cyclic redundancy check data indicates a valid condition;
    wherein the non-volatile computer memory comprises:
        a first data region including a plurality of subregions;
        the redundant memory area associated with the first data region, the redundant memory area including:
            the first portion associated with a first of the plurality of subregions; and
            the second portion including a plurality of error correction code (ECC) regions, the plurality of error correction code (ECC) regions associated with the plurality of subregions.

7. The method of claim 6, further comprising:
    determining that the cyclic redundancy check data indicates an invalid condition;
    reading the second portion of the redundant memory area, the second portion of the redundant memory area including error correction code (ECC) data;
    performing one or more error correction operations on the page based on the ECC data; and
    using the relative sector index and the block number to organize the page of the non-volatile computer memory.

8. The method of claim 6, wherein the first portion has a size of less than 8 bytes.

9. The method of claim 6, wherein the first portion has a size of approximately 7 bytes.

10. The method of claim 6, wherein the second portion has a size of about 9 bytes.

* * * * *